(12) United States Patent
Ieiri

(10) Patent No.: US 9,054,545 B2
(45) Date of Patent: Jun. 9, 2015

(54) POWER SUPPLY CONTROL DEVICE AND IMAGE FORMING APPARATUS

(75) Inventor: Yuji Ieiri, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 258 days.

(21) Appl. No.: 13/556,319

(22) Filed: Jul. 24, 2012

(65) Prior Publication Data
US 2013/0033719 A1 Feb. 7, 2013

(30) Foreign Application Priority Data
Aug. 2, 2011 (JP) ................................. 2011-169334

(51) Int. Cl.
| | |
|---|---|
| G06K 15/00 | (2006.01) |
| H02J 9/00 | (2006.01) |
| G06F 21/60 | (2013.01) |
| G06K 15/02 | (2006.01) |
| G06F 1/32 | (2006.01) |

(52) U.S. Cl.
CPC .................. *H02J 9/005* (2013.01); *G06K 15/00* (2013.01); *G06F 21/608* (2013.01); *G06K 15/02* (2013.01); *G06F 1/3265* (2013.01); *Y02B 60/1242* (2013.01)

(58) Field of Classification Search
USPC ............ 358/468, 1.13, 1.14, 1.15; 399/77, 88
See application file for complete search history.

(56) References Cited

U.S. PATENT DOCUMENTS

| | | | | |
|---|---|---|---|---|
| 6,055,068 | A * | 4/2000 | Abe et al. ...................... | 358/468 |
| 6,801,730 | B2 * | 10/2004 | Johnson et al. ................ | 399/75 |
| 7,866,958 | B2 * | 1/2011 | Patel ........................... | 417/423.1 |
| 2007/0211285 | A1 * | 9/2007 | Shipton ........................ | 358/1.15 |

FOREIGN PATENT DOCUMENTS

| | | |
|---|---|---|
| JP | 10-209818 | 8/1998 |
| JP | 11-038841 | 2/1999 |
| JP | 2002-063011 | 2/2002 |
| JP | 2007-005968 | 1/2007 |
| JP | 2007-013385 | 1/2007 |
| JP | 2008-011690 | 1/2008 |

* cited by examiner

*Primary Examiner* — Vu B Hang
(74) *Attorney, Agent, or Firm* — Oblon, McClelland, Maier & Neustadt, L.L.P.

(57) ABSTRACT

A power supply control device includes a photoelectric conversion unit to convert light energy to electricity, and a power supply control signal output unit driven by power converted by the photoelectric conversion unit and configured to detect a change in lighting intensity at an installation environment of the power control device based on an output voltage of the photoelectric conversion unit to output a power control signal which causes power of an external device to start up or shut down to the external device.

6 Claims, 6 Drawing Sheets

POWER SUPPLY CONTROL DEVICE AND IMAGE FORMING APPARATUS

CROSS-REFERENCE TO RELATED APPLICATION

This patent application is based on and claims priority pursuant to 35 U.S.C. §119 to Japanese Patent Application No. 2011-169334, filed on Aug. 2, 2011, in the Japan Patent Office, the entire disclosure of which is hereby incorporated by reference herein.

BACKGROUND OF THE INVENTION

1. Field of the Invention

This invention relates to a power supply control device that controls a power supply of an external device, and to an image forming apparatus, such as a printer, a digital copier, a facsimile machine, etc., which includes the power supply control device.

2. Description of the Related Art

In most electric equipment including image forming apparatuses, some circuitry is kept running in a "standby" state in which the main power supply is on even while the electrical equipment is not being used. Meanwhile, when set to a Plug-in state in which an AC plug is inserted into a commercial power supply outlet and the main power is turned off, or set to a Plug-off state in which the AC plug is not inserted into the commercial power supply, operating instructions from a remote user cannot be accepted, although, it is possible to achieve power consumption lower than that in the standby state.

However, in such conventional electrical equipment, even if it is clear that the user does not use the equipment for a long period of time, for example, at night or on holidays, often the standby state is maintained continuously without pulling out the AC plug and turning off the main power supply in order to omit a turn-off operation and a turn-on operation to turn on the main power supply which the user performs at the next operation. Accordingly, there is a problem that more power than that in the Plug-off and Plug-in states is consumed.

To solve the problem described above, a technology to reduce the power consumption from the commercial power supply is already known in which a necessary operating power is supplied from a solar cell to receive the remote operation from the user continuously. For example, JP 2002-063011A discloses a device which supplies power generated by a solar cell to a printer in an energy-saving mode to reduce the standby power consumption so as to reduce total power consumption from the commercial power supply.

However, in the device disclosed in JP 2002-063011A which supplies an operation power at the energy-saving mode from the solar cell to reduce the power consumption from the commercial power supply, it is needed to generate sufficient power under a low lighting intensity environment by an indoor artificial lighting. Accordingly, it requires use of a large solar cell, which increases both the size and the cost of the apparatus.

SUMMARY OF THE INVENTION

The present invention provides a power supply control device and an image forming apparatus incorporating the power supply control device that reduces standby power consumption with a configuration using inexpensive parts without sacrificing user convenience.

The power supply control device includes a photoelectric conversion unit configured to convert light energy to electricity and output an output voltage corresponding to an intensity of the light energy, and a power supply control signal output unit driven by power converted by the photoelectric conversion unit and configured to detect a change in a lighting intensity at an installation environment of the power supply control device based on the output voltage of the photoelectric conversion unit and output a power control signal that starts up or shuts down power of an external device.

The power supply control signal output unit may include a determination unit to determine the feasibility of outputting the power control signal based on a status of the signal input from the external device.

The signal input from the external device may be a signal that indicates a status of the power of the external device.

The power supply control signal output unit may output a predetermined notification signal together with the power control signal when the power control signal is output.

The photoelectric conversion unit may be a solar cell.

The power supply control signal output unit may include a hysteresis comparator circuit which detects a change in the light intensity, and outputs the power control signal in accordance with an output of the hysteresis comparator circuit.

The image forming apparatus includes the above-described power supply control device and a power up and shut down unit to start up and shut down the power of the image forming apparatus based on the power control signal input from the power supply control device. A starting up of the power of the image forming apparatus by the power up and shut down unit enables the image forming apparatus to perform image formation.

Figure 10:
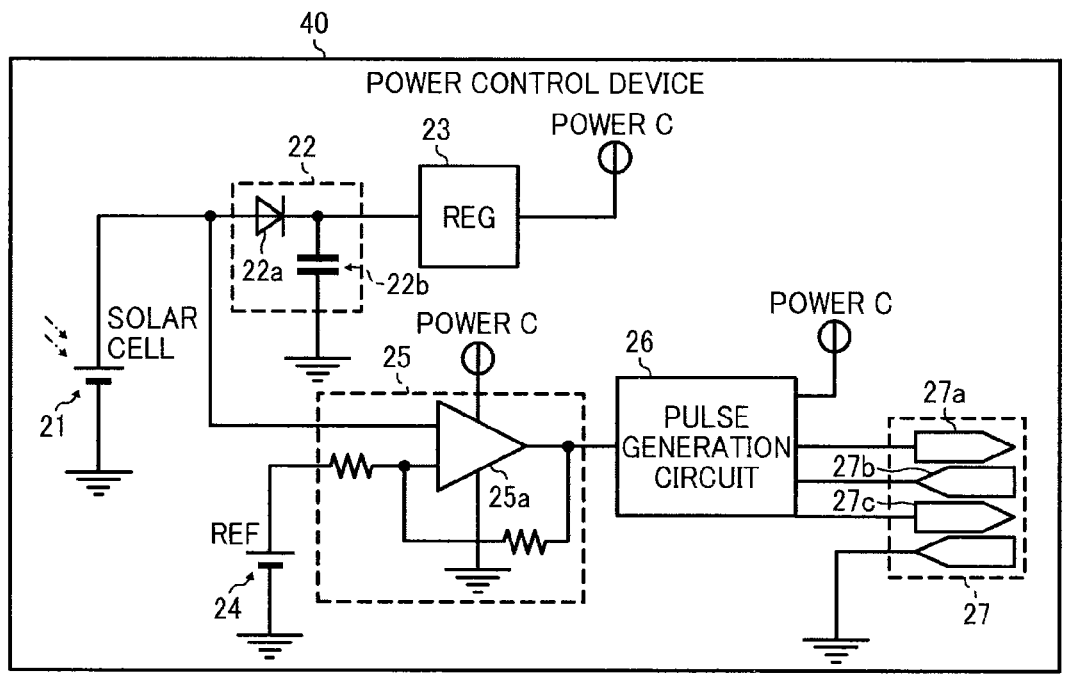
Figure 11:
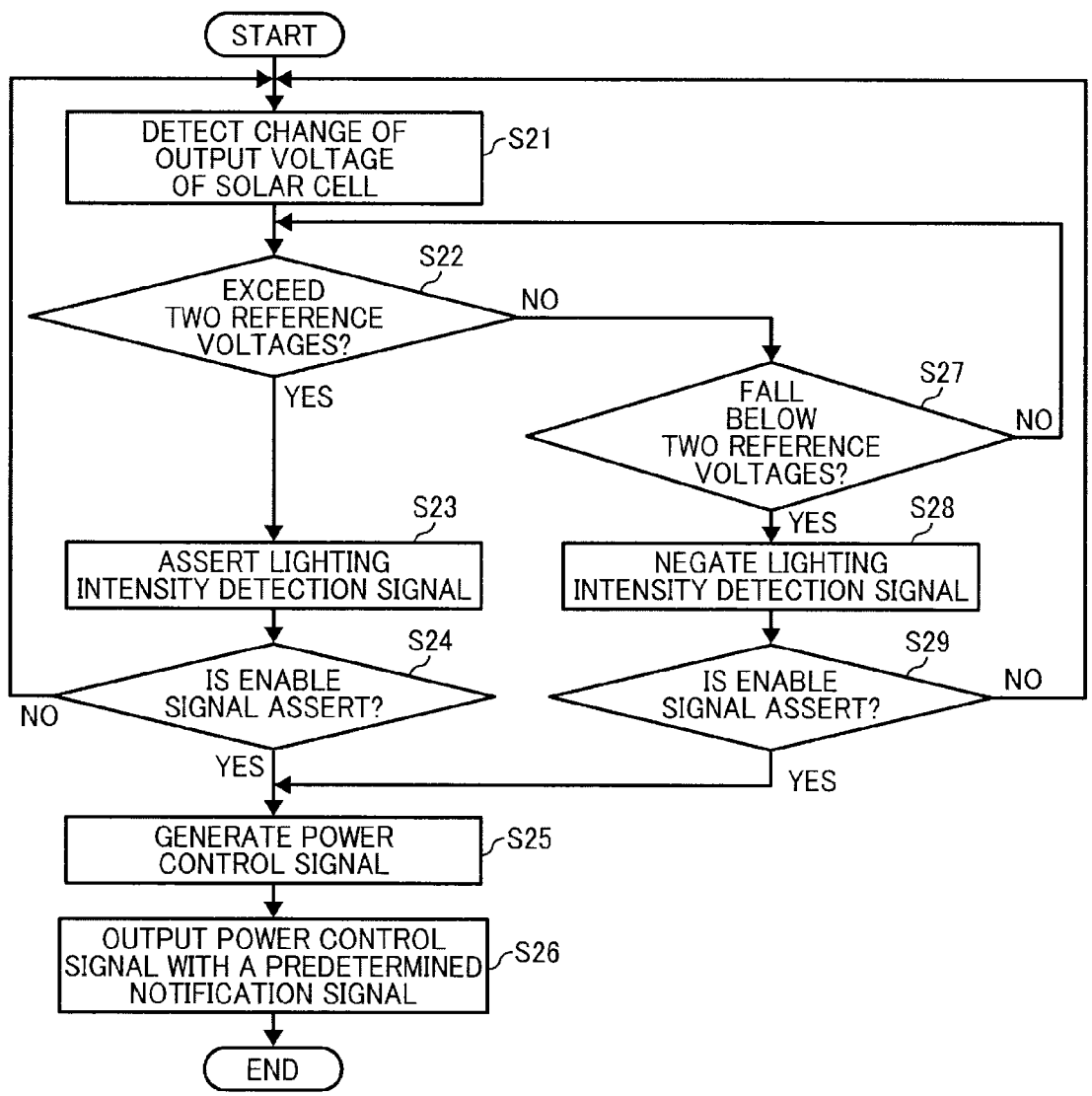

FIG. 10 is a block diagram showing a third embodiment of a configuration of a power control device using a solar cell; and FIG. 11 is a flowchart showing an example of the operation of the power control device 40 shown in FIG. 10.

DETAILED DESCRIPTION OF THE INVENTION

First Embodiment

Now, a power control device according to a first embodiment of the present invention is described.

Figure 1:
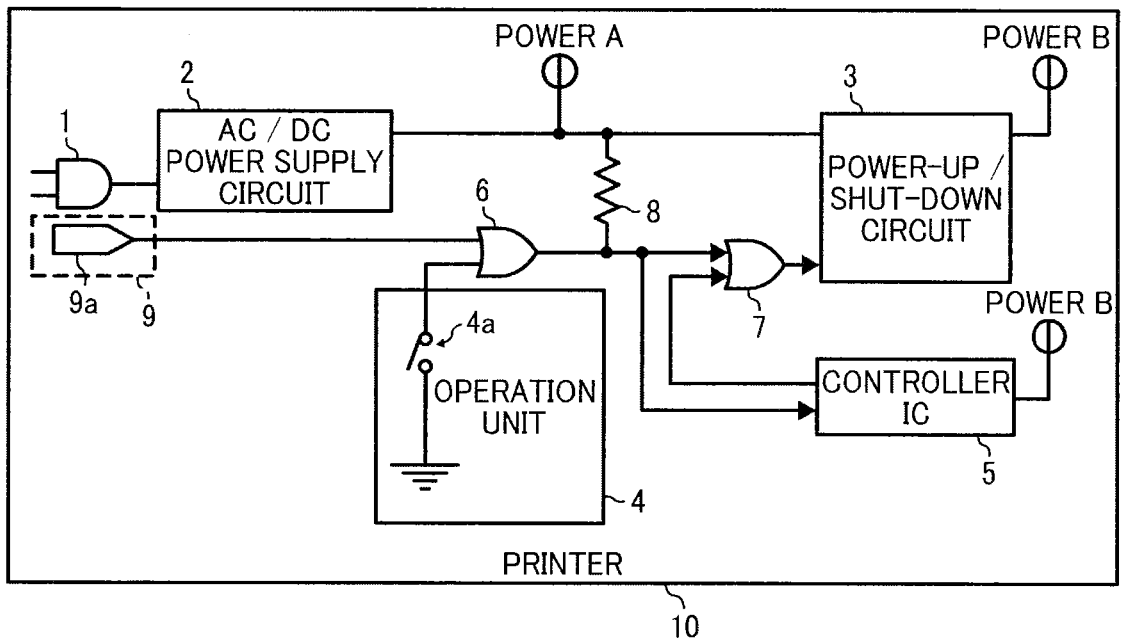
FIG. 1 is a block diagram showing a configuration of a main portion of a printer which can communicate with a first embodiment of a power control device according to the present invention.

FIG. 1 is a block diagram showing a configuration of a printer 10 that is one example of an external device or piece of equipment that can communicate with the power control device according to the first embodiment of the present invention.

The printer 10 includes an AC (alternating current) plug 1, an AC/DC (Direct Current) power supply circuit 2, a power-up and shut-down circuit 3, an operation unit 4, a controller IC 5, OR circuits 6 and 7, a pull-up resistor 8, and a connector 9.

The AC plug 1 is inserted into a commercial power supply outlet, to supply AC power from the commercial power supply (referred as "AC power") to the equipment (the printer 10).

The AC/DC power supply circuit 2 converts the AC power from the AC plug 1 to a DC power supply (referred as "DC power") to generate power A.

The power-up and shut-down circuit 3 is driven by the power A to turn the power of the printer 10 (hereinafter referred as "equipment") on and off in accordance with a signal input from the OR circuit 7 so as to cause the controller IC 5 operating. Further, when the power of the equipment is to be turned on, power B is generated.

The operation unit 4 includes an input unit having a variety of buttons, including a power button 4a which turns the power of the equipment on and off manually, and a display unit which displays the state of the equipment. When the power button 4a is pressed down, a pressed signal (power on and off signal) to indicate the operation is transmitted to one input terminal of the OR circuit 6.

The controller IC 5 is driven by the power B and executes software programs that control the output of a power hold signal in accordance with a signal input from an output terminal of the OR circuit 6, and generates the image data for printing (image forming) based on the print data from a host PC (personal computer) 17 described later (refer to FIG. 2) to cause the print unit to perform the printing operation. The printing control operation including image data generation will be described later, referring to FIG. 2.

The connector 9 is used to connect with the connector 27 of the power control device 20 so as to communicate with the power control device 20 described later (refer to FIG. 3). The power control signal from the power control device 20 may be input to another input terminal of the OR circuit 6 by a pin 9a.

Now, the control operation in the printer 10 relating to the present invention is described.

When the AC plug 1 is inserted into the commercial AC power supply outlet, the AC/DC power supply circuit 2 generates the power A to supply it to the power-up and shut-down circuit 3.

The power-up and shut-down circuit 3 does not generate the power B at this state, and the equipment maintains the power off condition. When the power button 4a of the operation unit 4 is pressed by the user, the button pressed signal is reported via the OR circuits 6 and 7 so that the power B is generated to turn the power of the equipment on.

Then, the controller IC 5 starts to operate and asserts a power hold signal to the OR circuit 7 so that the supply of the power B to the inside of the equipment is maintained even when the user stops to press the power button 4a. Accordingly, the equipment keeps the power on state.

When the power button 4a is pressed down again to turn the power off, the button pressed signal is notified to the controller IC 5.

Then, the controller IC 5 can turn the power of the equipment off by the power-up and shut-down circuit 3 by negating the power control signal by software control.

Further, when the power control signal which mimics the button pressed signal is input from a pin 9a of the connector 9 to report it to the controller IC 5, the controller IC 5 similarly causes the power-up and shut-down circuit 3 to perform the on and off control of the power of the equipment. Therefore, the equipment can be controlled to turn the power of the equipment on and off, just as if the user presses the power button 4a.

Thus, the power-up and shut-down circuit 3 and the controller IC 5 function as power-up and shut-down means.

Further, in addition to the button pressed signal issued by pressing the power button 4a down, or by replacing it, it is possible to input the on and off signal issued by operation from the host PC 17 described later (refer to FIG. 2) to turn the power of the equipment on and off.

Figure 2:
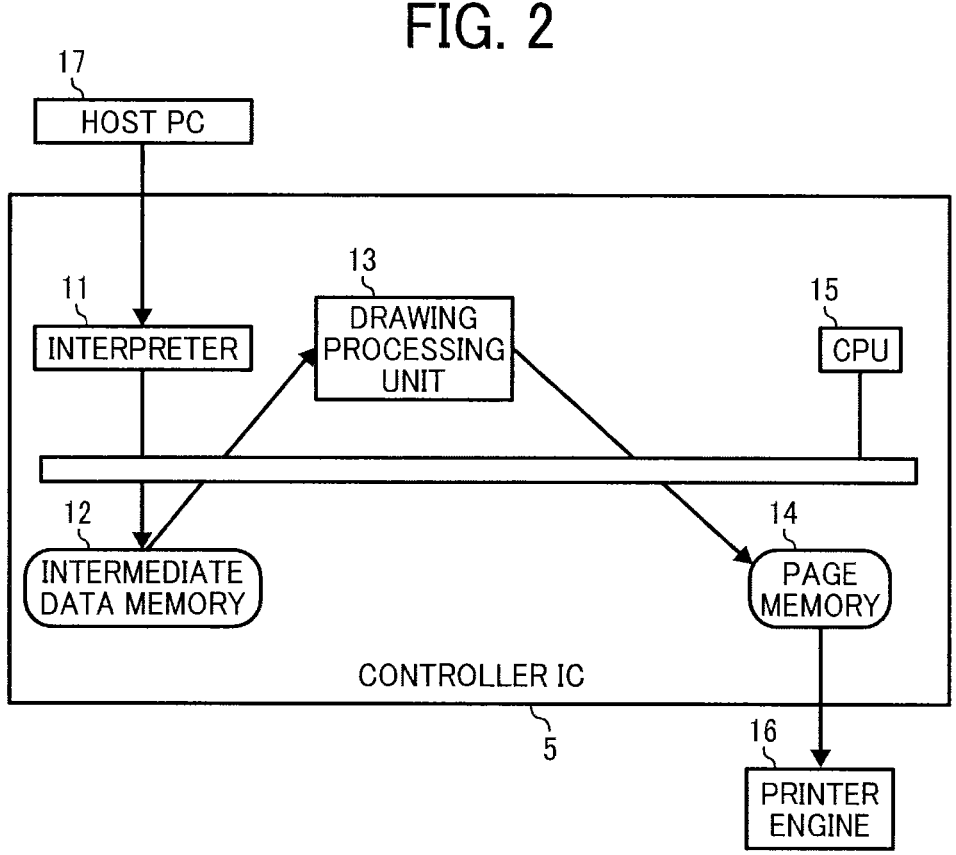
FIG. 2 is a block diagram illustrating a general configuration of a part related to printing control of the controller IC 5 in FIG. 1.

FIG. 2 is a block diagram illustrating an outline of a configuration of the units relating to the printing control of the controller IC 5 of FIG. 1.

The controller IC 5 is a printer controller to form the printer 10 with a printer engine 16, which is a printing unit omitted from FIG. 1. When the print data is sent to the printer 10 from the host PC 17, an interpreter 11 receives the print data and stores it in an intermediate data memory 12.

Then, the print data is transferred from the intermediate data memory 12 to a drawing processor 13, and the rendering process is carried out in accordance with drawing commands that are included in the print data. More specifically, the drawing is performed on the page memory 14, which is the memory for drawing by accessing the page memory 14.

It is to be noted that a band memory may be used replacing the page memory 14. Further, a RAM (random access memory) may be used as the page memory 14 and the band memory.

The drawing processor 13 corresponds to a rendering engine (renderer) which performs the memory access in which the memory is accessed at each word width of the memory as the minimum unit when the rendering process is performed.

The printer engine 16, which performs the printing operation, actually performs the printing operation on the print medium such as paper while referring to the drawing result on the page memory 14.

Thus, when the drawing is performed by the printer 10, the print data is transferred to the controller IC 5 from the host PC 17 as a collection of drawing commands. The drawing commands include text, graphics, images, etc., and each type has the distinctive characteristic.

A CPU 15, which exerts overall control of the controller IC 5 and can receive the print data from the host PC 17, performs the saving processing to store the data into the intermediate data memory 12 and the rendering processing by running the software in ROM (read only memory) and RAM, not shown, (a part thereof is interpreter 11 and the drawing processor 13).

Figure 3:
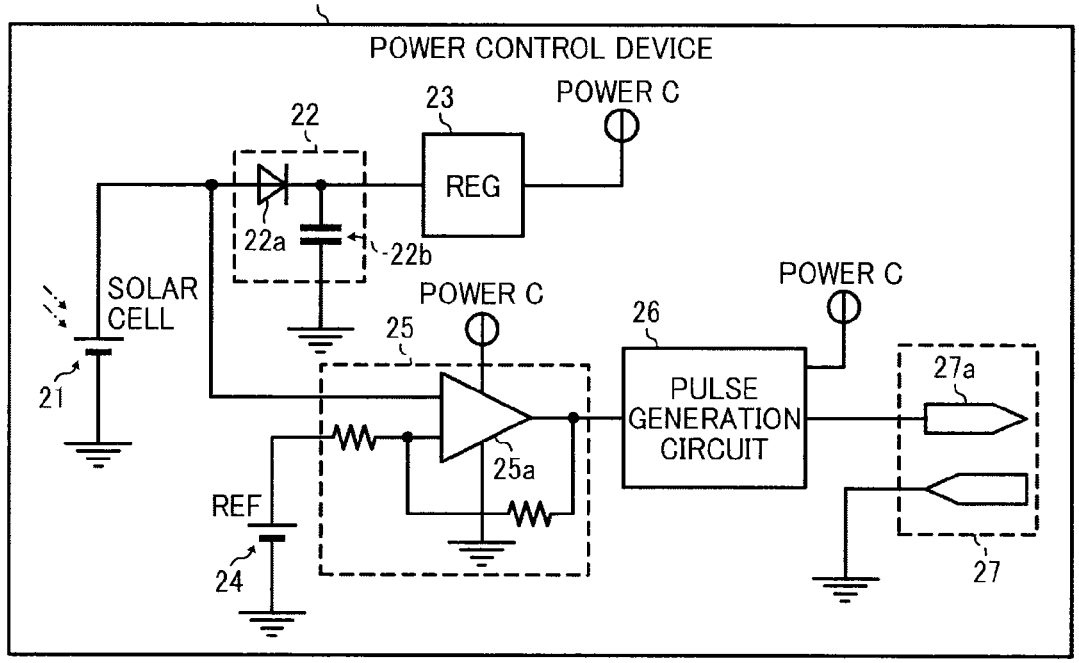
FIG. 3 is a block diagram showing a first embodiment of the power control device using a solar cell according to the present invention.

FIG. 3 is a block diagram showing a first embodiment of the power control device using a solar cell according to the present invention.

The power control device 20 includes power control signal generation circuitry that in turn includes a solar cell 21, a rectifying and smoothing circuit 22, a regulator (REG) 23, a reference voltage generating circuit 24, a hysteresis comparator circuit 25, a pulse generation circuit 26, and a connector 27.

The solar cell 21 is a photoelectric conversion means for converting light energy to electricity. Further, other devices which can convert light energy to electricity may be used as the photoelectric conversion means other than the solar cell 21.

The rectifying and smoothing circuit 22 includes a rectifying diode 22a and a smoothing capacitor 22b to rectify the current and smooth the voltage of power generated by the solar cell 21.

The regulator 23 maintains a constant output voltage and current, and the reference voltage generating circuit 24 generates two different predetermined reference voltages that are input sequentially to one of the input terminals of the operation amplifier 25a of the hysteresis comparator circuit 25.

The hysteresis comparator circuit 25 is driven by power C generated by the rectifying and smoothing circuit 22 and the regulator 23 from the power generated by the solar cell 21, compares the output voltage of the solar cell 21 with the two reference voltages REF, and outputs the comparison result as a lighting intensity detection signal. Further, in place of the hysteresis comparator circuit 25, an ordinary comparator circuit that compares the output voltage of the solar cell 21 with a single reference voltage and outputs the comparison result as the lighting intensity detection signal may be used. In such a case, the reference voltage generation circuit 24 generates a single predetermined reference voltage.

The pulse generation circuit 26 generates the power control signal which turns the power of the printer 10 shown in FIG. 1 on or off based on the lighting intensity detection signal input from the hysteresis comparator circuit 25.

The connector 27 is provided to connect the connector 9 of the printer 10 so as to communicate with the printer 10, thereby enabling output of the power control signal from the pulse generation circuit 26 to the printer 10 through the pin 27a.

Now, the control operation relating to this invention in this power control device 20 is described.

The power control device 20 can control the power of the printer 10 using the power control signal.

The solar cell 21 generates the power C to be used in the power control device 20 by supplying the generated power to the regulator 23 through the rectifying and smoothing circuit 22 so as to provide the power for the operation of the device.

Further, the output voltage of the solar cell 21 is input to the hysteresis comparator circuit 25 to compare with the two reference voltages REF. Then, it is detected whether or not the lighting intensity at the installation environment of the power control device 20 (same as the installation environment of the printer 10) falls below or exceeds a predetermined lighting intensity (change in the lighting intensity) to output the detection result signal to the pulse generation circuit 26 as the lighting intensity detection signal.

The pulse generation circuit 26 detects the edge of the lighting intensity signal output from the hysteresis comparator circuit 25 which is toggling (hereinafter refer simply as "detection"), and generates a pulsed power control signal for output to the printer 10 to be connected and transmit the power on and off instruction.

Figure 4:
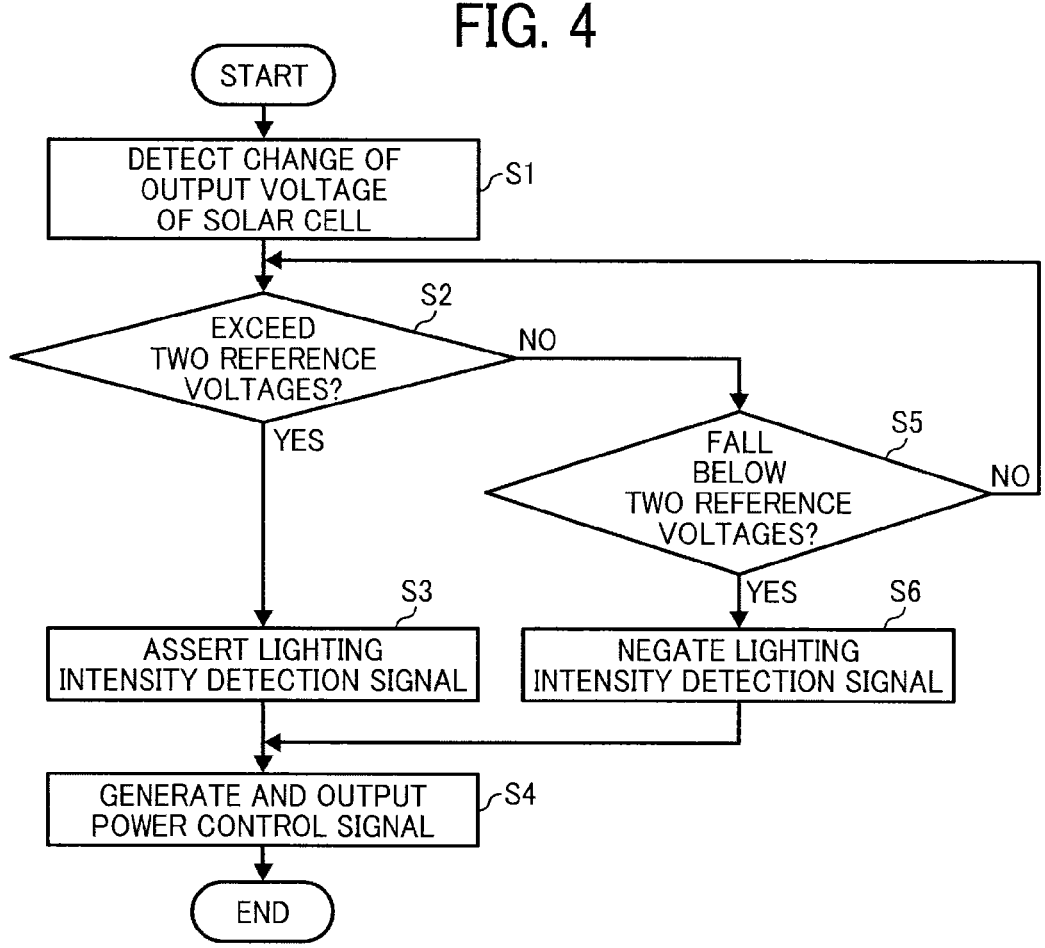
FIG. 4 is a flowchart showing an example of operation of a power control device 20 shown in FIG. 3.

FIG. 4 is a flowchart showing an example of the operation of the power control device 20 shown in FIG. 3. Now, in each figure including FIG. 4, a step is abbreviated as "S".

In the power control device 20, when the lighting intensity at the installation environment is changed due to turning the indoor light on or off, the hysteresis comparator circuit 25 detects the change as a change (increase or decrease) in the output voltage of the solar cell 21 (step S1).

When the detected output voltage exceeds the two reference voltages REF because of the increase in the output voltage of the solar cell 21 (exceeds a predetermined lighting intensity), the hysteresis comparator circuit 25 asserts the lighting intensity detection signal to be output (steps S2, S3), and negates the lighting intensity detection signal to be output (steps S5, S6) when the detected output voltage falls below the two reference voltages REF (falls below a predetermined lighting intensity).

The pulse generation circuit 26 detects the change (toggling) in the lighting intensity detection signal from the hysteresis comparator circuit 25 to generate a pulsed power control signal indicating the detection result and outputs it to the printer 10 through the connector 27 to instruct the turning on and off of the power to the printer 10 (step S4).

Thus, the hysteresis comparator circuit 25 and the pulse generating circuit 26 work as the power control signal output means.

Thus, in the power control device 20, the hysteresis comparator circuit 25 and the pulse generation circuit 26 are driven by the power converted from the light energy by the solar cell. And, based on the output voltage of the solar cell 21, the change in the lighting intensity at the installation environment of the power control device 20 is detected to output the power control signal to the printer 10 (to be controlled) to cause the printer 10 power up and shut down.

This capability can be achieved using a compact and inexpensive solar cell 21 and control circuit. Accordingly, without sacrificing user convenience and without receiving the power supply from the printer 10, and with an inexpensive power control device which does not require a special sensor dedicated to detect the lighting intensity, it is possible to reduce the power consumption in the standby mode of the printer 10. Further, for example, it is possible to set the plug-in state by turning off the power of the printer 10 at night and on holidays automatically without the operation by the user.

Further, since the change in the lighting intensity is detected by the hysteresis comparator circuit 25, the detection result is not changed frequently. Accordingly, the printer 10 is not powered up or shut down wastefully.

Second Embodiment

Next, a second embodiment of the present invention is described.

Figure 5:
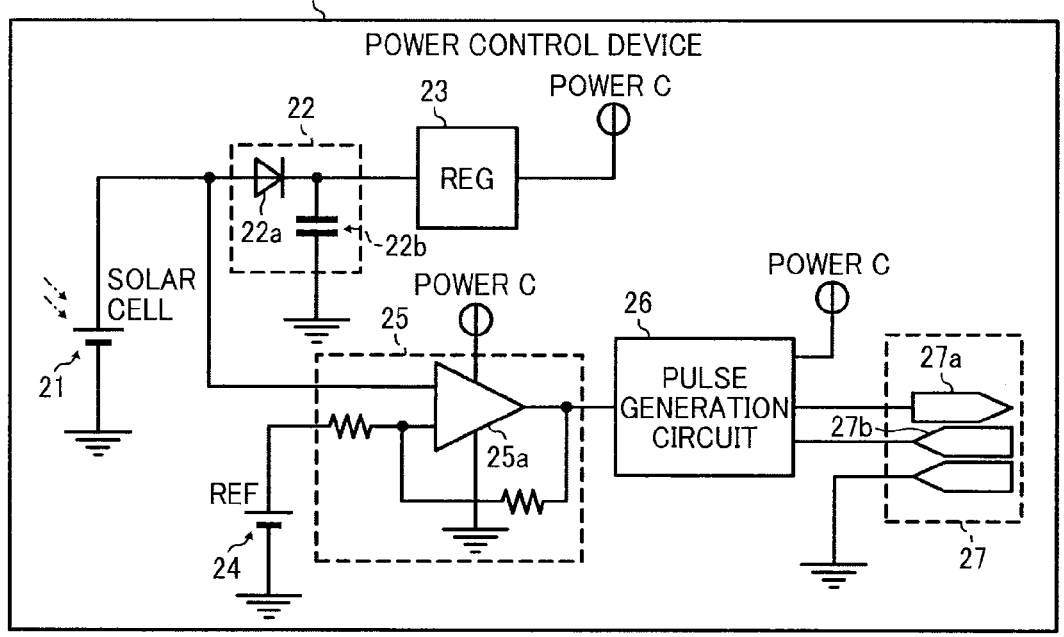
FIG. 5 is a block diagram showing a second embodiment of a configuration of a power control device using a solar cell.

FIG. 5 is a block diagram showing a second embodiment of a configuration of a power control device using the solar cell. In FIG. 5, identical reference characters are assigned to identical or similar members in FIG. 3, and descriptions thereof are omitted.

In the power control device 30 according to the second embodiment, a pin 27b is added to the connector 27 to receive a lighting intensity detection enable signal from the printer 10 shown in FIG. 1.

The power control device 20 described in FIGS. 3 and 4 is configured to output the power control signal each time the lighting intensity is changed. By contrast, the power control device 30 according to the second embodiment is configured so that, since the lighting intensity detection enable signal from the printer 10 can be input to the pulse generation circuit 26, the generation and output of the power control signal can be disabled by settings at the printer 10.

Figure 6:
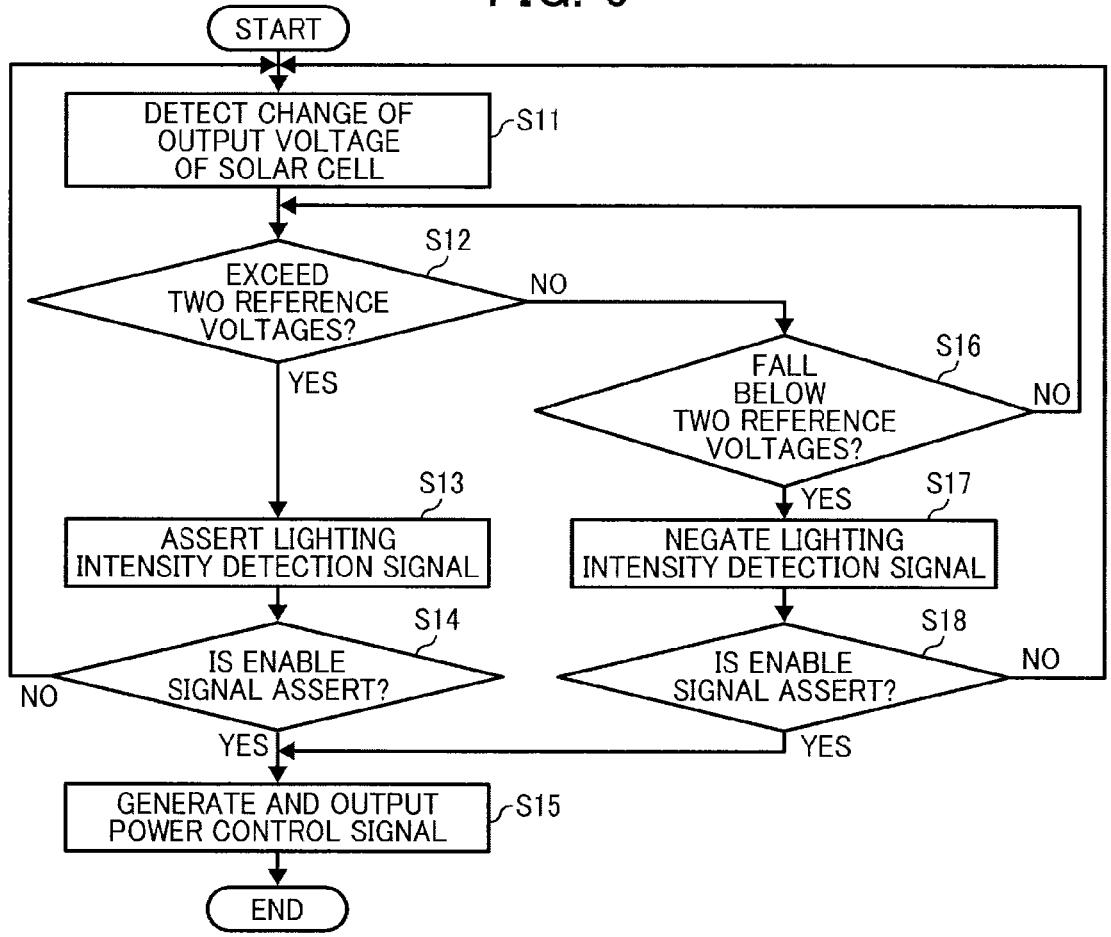
FIG. 6 is a flowchart showing an example of the operation of the power control device 30 shown in FIG. 5.

FIG. 6 is a flowchart showing an example of the operation of the power control device 30 shown in FIG. 5.

In the power control device 30, the hysteresis comparator circuit 25 performs operations similar to those in steps S1 through S3, S5 and S6 in FIG. 4 in steps S11 through S13, S16 and S17.

When the pulse generation circuit 26 detects the change of the lighting intensity detection signal to assert by the hysteresis comparator circuit 25 in step S13 (at the detection of light on), the pulse generation circuit 26 monitors the lighting intensity detection enable signal from the printer 10. (step S14)

When the light intensity detection enable signal from the printer 10 is the negate state (L), it is determined that it is to be the disable state in which the change of the lighting intensity detection signal from the hysteresis comparator circuit 25 is disabled (in other words, the power control signal is prohibited to be output), and processing turns to step S11.

When the light intensity detection enable signal from the printer 10 is the assert state (H), it is determined that it is to be the enable state in which the change of the lighting intensity detection signal from the comparator hysteresis circuit 25 is enabled (in other words, the power control signal is allowed to be output) and a pulsed power control signal indicating the detection result of the lighting intensity detection signal is generated. And, the power control signal is output to the printer 10 through the connector 27 to instruct the turning on and off of the power to the printer 10 (step S15).

Meanwhile, when it is detected that the lighting intensity detection signal is changed to negate by the hysteresis comparator circuit 25 in the step S17 (at the detection of the light off), the light intensity detection enable signal from the printer 10 is also monitored (S18).

When the light intensity detection enable signal from the printer 10 is the negate state (L), it is determined that it is to be the disable state in which the change of the lighting intensity detection signal from the hysteresis comparator circuit 25 is disabled, and processing returns to step S11.

Further, when the lighting intensity detection enable signal from the printer 10 is the assert state (H), it is determined that it is to be the enable state in which the change of the light intensity detection signal from the hysteresis comparator circuit 25 is enabled, and a pulsed signal of the power control signal indicating the detection result of the lighting intensity detection signal is generated. Further, the power control signal is output to the printer 10 through the connector 27 to instruct the turning on and off of the power to the printer 10 (step S15)

Now, the power condition of the printer 10 is described when the power control device 30 detects the on and off state of the indoor light to output the power control signal.

FIGS. 7A through 7D schematically show the state of the power of the printer 10 which is operating normally without using the lighting intensity detection enable signal, when the power control device 30 detects the on and off state of the indoor light and outputs the power control signal.

Figure 7:
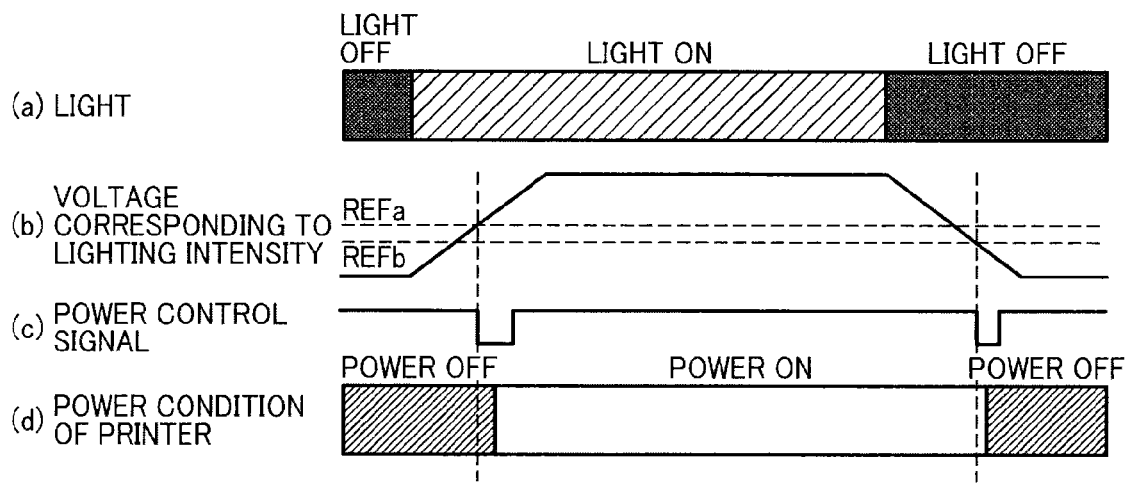
FIG. 7 is a timing chart showing the state of the power of the printer which is operating normally without using a lighting intensity detection enable signal when the power control device 30 detects the on and off state of the indoor lighting and outputs a power control signal.

When the indoor light, for example, a light in the office, etc., where the power control device 30 and the printer 10 are installed is turned on as shown in FIG. 7A, as shown in FIG. 7B the lighting intensity is increased and the output voltage (lighting intensity corresponding voltage) of the solar cell in the power control device 30 corresponding to the lighting intensity is increased also.

When the output voltage corresponding to the lighting intensity exceeds the two reference voltages, REFa and REFb, the hysteresis comparator circuit 25 asserts the lighting intensity detection signal, then, the pulse generation circuit 26 detects the change of the lighting intensity detection signal, and generates a pulsed signal of the power control signal indicating the detection result to output to the printer 10 as shown in FIG. 7C.

In the printer 10, by the input of the power control signal, the controller IC 5 turns the power of the equipment on by the power-up and shut-down circuit 3 as shown in FIG. 7D.

By contrast, when the indoor light is turned off as shown in FIG. 7A, the lighting intensity is decreased as shown in FIG. 7B, and the voltage corresponding to the lighting intensity is decreased also. Further, when the voltage corresponding to the lighting intensity falls below the two reference voltages, REFa and REFb, the hysteresis comparator circuit 25 negates the lighting intensity detection signal, then, the pulse generation circuit 26 detects the change of the lighting intensity detection signal, and generates a pulsed power control signal indicating the detection result to output to the printer 10 as shown in FIG. 7C.

In the printer 10, by the input of the power control signal, the controller IC 5 turns the power of the equipment off by the power-up and shut-down circuit 3 as shown in FIG. 7D.

When the printer 10 is in such a power condition, it is possible to maintain the off condition with the power of the printer installed in the office, etc., at night and holidays, for example, at which times the light is off, thereby reducing power consumption.

However, in such a power control process, when the power of the printer 10 is on in the initial state and the power of the printer is turned off by the user's operation during the light on condition of the indoor light, the hysteresis comparator circuit 25 detects the change in the lighting intensity and the pulse generation circuit 26 outputs the power control signal, the power condition of the printer becomes a condition reverse to the desired condition.

FIGS. 8A through 8D are schematic diagrams showing the state of the power of the printer 10 in which it is not operating normally because of not using the lighting intensity detection enable signal, when the power control device 30 detects the on and off state of the indoor light and outputs the power control signal.

Figure 8:
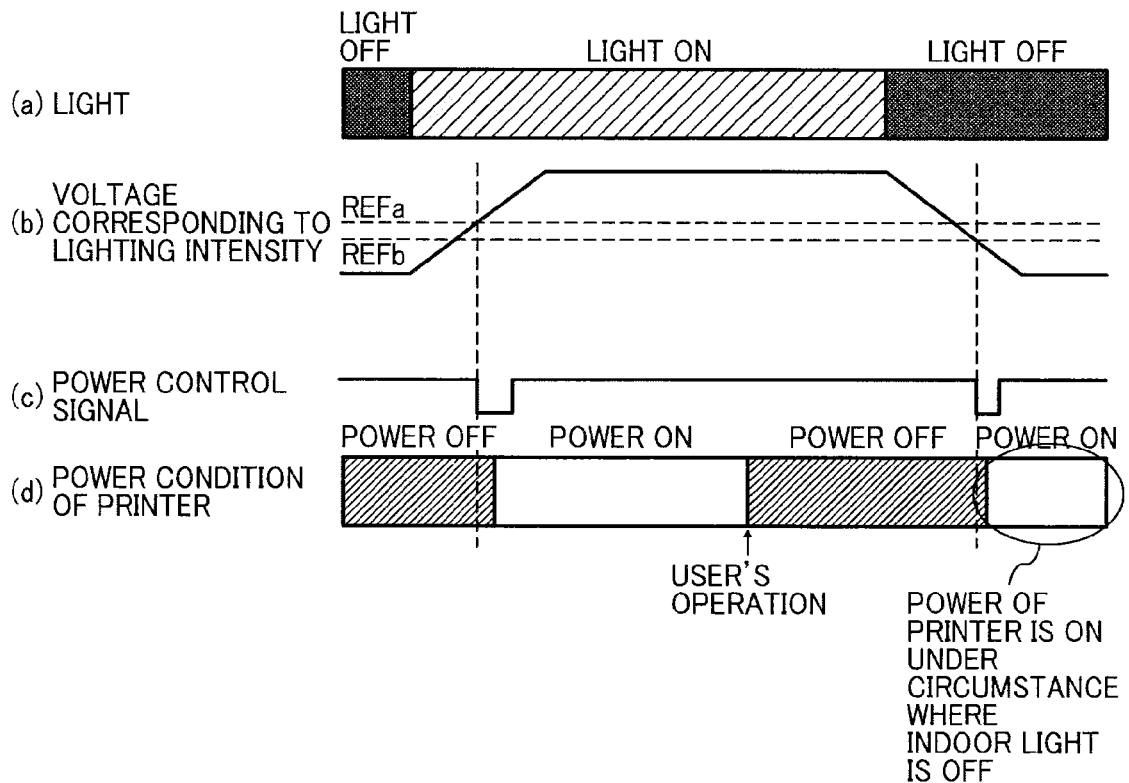
FIG. 8 is a timing chart showing the state of the power of the printer which is not operating normally because of not using the lighting intensity detection enable signal when the power control device 30 detects the on and off state of the indoor lighting and outputs the power control signal, similarly.

In this example, when the indoor light is turned off after making the power of the printer 10 off by the user's operation etc. as shown in FIG. 8D while the light is in the on condition as shown in FIG. 8A, the power of the printer is turned on by triggering it.

More specifically, when the indoor light is turned off, the lighting intensity is decreased as shown in FIG. 8B, and the voltage corresponding to lighting intensity is decreased also. Then, when the voltage corresponding to lighting intensity falls below the two reference voltages, REFa and REFb, the hysteresis comparator circuit 25 negates the lighting intensity detection signal, then, the pulse generation circuit 26 detects the change in the lighting intensity detection signal, and generates a pulsed signal of the power control signal indicating the detection result to output to the printer 10 as shown in FIG. 8C.

In the printer 10, by the input of the power control signal, the controller IC 5 turns the power of the equipment on by the power-up and shut-down circuit 3 as shown in FIG. 8D.

Thus, the power of the printer is turned on by turning off the indoor light as the trigger. Therefore, it is not possible to reduce the power consumption even when the indoor light is off.

FIGS. 9A through 9E are schematics showing the state of the power of the printer 10 in which it is operating normally using the lighting intensity detection enable signal when the power control device 30 detects the on and off state of the indoor light and outputs the power control signal.

The controller IC 5 or the power-up and shutdown circuit 3 of the printer 10 outputs a power state notification signal to notify the power state of the equipment to the power control device 30 through a pin of the connector 9, not shown.

The pulse generation circuit 26 of the power control device 30 monitors the power state of the printer 10 by inputting the power state notification signal (STATUS) from the printer 10. And the power state notification signal is used as the lighting intensity detection enable signal (or an output enable signal for the power control signal).

The logic of the power state notification signal used as the lighting intensity detection enable signal when it is detected by increasing the lighting intensity (at the detection of the light on) may be the reverse logic to that when it is detected by decreasing the lighting intensity (at the detection of the light off) so as to avoid the power off during the light on and the power on during the light off.

Further, the printer 10 may output a signal other than the power state notification signal (for example, a signal generated by the operation unit 4 in FIG. 1, or a signal generated by the operation on the host PC 17 in FIG. 2) to the power control device 30, the pulse generation circuit 26 of the power control device 30 receives the output signal to use it as the lighting intensity detection enable signal (or an output enable signal for the power control signal).

Thus, in the power control device 30, the pulse generation circuit 26 determines the necessity of the output of the power supply control signal based on the condition of the lighting intensity detection enable signal input from the printer 10 that is the external device to be controlled. More specifically, considering factors other than the change in the lighting intensity, there is a case in which the power control signal is not output. Accordingly, it is possible to avoid the power up of the printer 10 at an unnecessary timing. Consequently, it is possible to reliably reduce the power consumption, thereby achieving a maximum reduction of the power consumption.

Further, the lighting intensity detection enable signal is used as the power state notification signal to notify the power state of the printer 10 so as to avoid the power on of the equipment at the decrease of the lighting intensity and the power off of the equipment at the increase of the lighting intensity. It is possible to reduce the power consumption due to the incorrect uses.

Third Embodiment

Next, the third embodiment of the present invention is described.

FIG. 10 is a block diagram showing a third embodiment of a configuration of a power control device using solar cell. In FIG. 10, identical reference characters are assigned to identical or similar members in FIG. 5, and descriptions thereof are omitted.

In the power control device 40 according to the third embodiment, a pin 27c is added to the connector 27 to output a predetermined notification signal to the printer 10 shown in FIG. 1.

Figure 9:
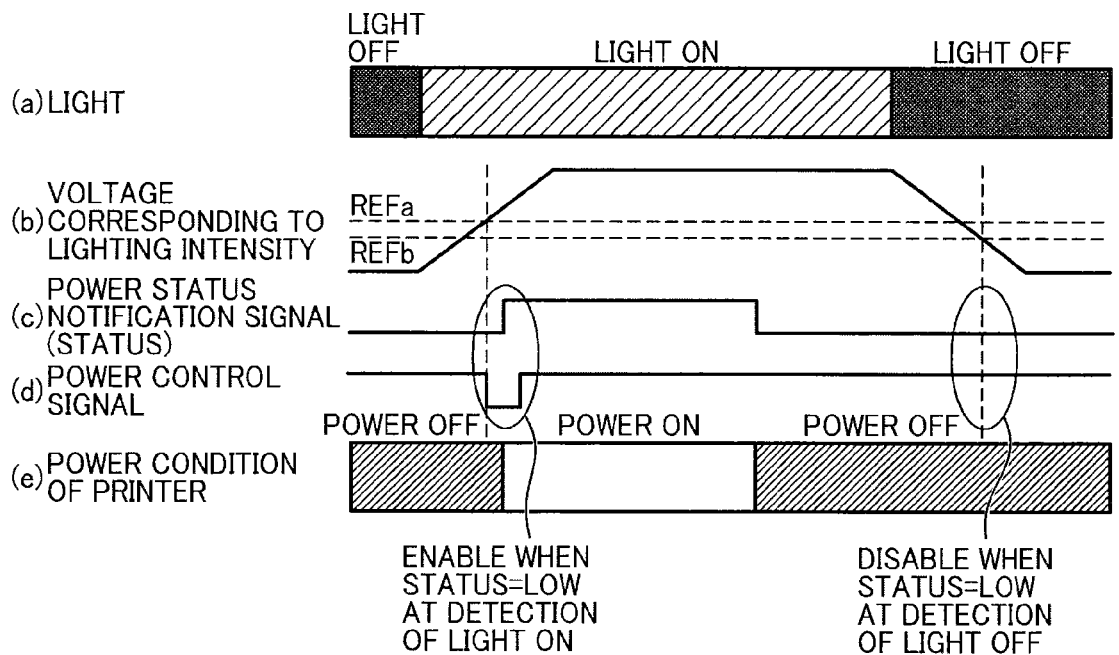
FIG. 9 is a timing chart showing the state of the power of the printer which is operating normally using the power state notification signal from the printer as the lighting intensity detection enable signal when the power control device 30 detects the on and off state of the indoor lighting and outputs the power control signal, similarly.

In the power control device 30 according to the second embodiment, as explained referring to FIG. 9, output of an unnecessary power control signal is prevented. However, when the printer 10 is placed indoors but near a window, for example, there is a possibility that the power is turned on even on holidays by sunlight.

When the power of the printer 10 to be controlled is controlled, the button pressed signal of the power button 4a shown in FIG. 1, etc., and the power control signal from the power control unit 40 input as the OR input are transmitted to the power-up and shut-down circuit 3 and the controller IC 5 to turn the power of the equipment on and off. Accordingly, it is not possible that the controller IC 5 distinguishes whether the power on and off operation of the equipment is caused by detecting the lighting intensity by the power control unit 40 or by the user's operation.

Therefore, in the power control unit 40 according to the third embodiment, a predetermined notification signal is output to the printer 10 when the pulse generation circuit 26 outputs the power control signal to the printer 10.

Further, the predetermined notification signals are, for example, a lighting intensity detection notification signal which indicates that the power control signal is output by detecting the change in the lighting intensity and an output source notification signal which indicates that the power control signal is output from the power control unit 40.

(Identification Signal of the Power Control Unit 40, Etc.)

The controller IC 5 of the printer 10 can determine the output factor of the power control signal based on the predetermined notification signal input together with the power control signal. Accordingly, it is possible to bifurcate control in accordance with what triggers the power control signal. In this case, the predetermined notification signal is assumed to be input directly to the controller IC 5 via a pin (not shown) of the connector 9.

FIG. 11 is a flowchart showing an example of the operation of the power control device 40 shown in FIG. 10.

In the power control device 40, the hysteresis comparator circuit 25 performs operations similar to those in steps S11 through S14, S16 through S18 in FIG. 6 in steps S21 through S24, S27 through S29.

After the pulse generation circuit 26 generates the power control signal in the step S25 similarly to the step S15 in FIG. 6, the pulse generation circuit 26 outputs the power control signal together with the predetermined notification signal to the printer 10 via the connector 27 to instruct the turning on and off of the power to the printer 10 (step S26).

The power-up and shut-down circuit 3 of the printer 10 performs the power on and off operation in response to pressing the power button 4a by the user firmly as described previously.

When the power control signal is input together with the predetermined notification signal, and when the power hold signal to the OR circuit 6 is in the assert state, the controller IC 5 negates the power hold signal and the power-up and shut-down circuit 3 turns the power of the equipment off.

By contrast, when the power control signal is input together with the predetermined notification signal, and when the power hold signal to the OR circuit 7 is in the negate state, the controller IC 5 performs the following control after booting up the software because the power of the equipment is turned by the power-up and shut-down circuit 3.

More specifically, when the power hold signal to the OR circuit 7 is asserted and it is recognized that outputting the power control signal is caused by the detection of the change in the lighting intensity at the power control device, it is determined whether the day is a weekday (operating day) or a holiday by referring to a calendar provided to the device.

Then, based on the determination, when the day is holiday, it is determined that the power of the equipment should be shut down so that the power hold signal to the OR circuit 7 is negated to turn the power of the equipment off by the power-up and shutdown circuit 3.

When the day is weekday, it is determined that the power of the equipment should be held so that the power hold signal to the OR circuit 7 is kept at assert to hold the power on condition of the equipment.

Thus, in the power control device 40, the predetermined notification signal is output when the power control signal is output to the printer 10 so that it is possible to determine by the software of the printer 10 to be controlled that the power control signal is the instruction to power-up and shut-down due to the change in the lighting intensity. Accordingly, it is possible to perform the power control with a high usability by the software.

In the present specification, as the embodiment according to the present invention, the power control device which can communicate with the printer is described. However, the disclosure of this patent specification is not limited to this embodiment, and is applicable to the power control device which can communicate with the other electrical equipment such as digital copiers, digital multi-functional apparatuses, facsimile machines, etc., further, such a power control device can be installed in a variety of the electrical equipment including image forming apparatus.

For example, according to the image forming apparatus including the power control device, the power of the image forming apparatus is turned on or shut down in accordance with the power control signal input from the power control device, when the power is turned on, it becomes possible to perform image forming. Thus, it is possible to reduce the power consumption at the standby state with a configuration (power control device) using inexpensive parts without using a special sensor that detects the lighting intensity without sacrificing user convenience. Further, the present invention is not limited to the embodiments described above, it is to be understood that the present invention includes all technical equivalents that operate in a similar manner.

The above-described embodiments are illustrative and do not limit the present invention. Thus, numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. It is therefore to be understood that, within the scope of the appended claims, the disclosure of the present invention may be practiced otherwise than as specifically described herein.

What is claimed is:

1. A power supply control device, comprising:
a photoelectric conversion unit configured to convert light energy to electricity and output an output voltage corresponding to an intensity of the light energy; and
a power supply control signal output unit driven by power converted by the photoelectric conversion unit,
the power supply control signal output unit being configured to detect a change in a lighting intensity at an installation environment of the power supply control device based on the output voltage of the photoelectric conversion unit, to determine whether a current day is a weekday based on the detected change in the lighting intensity and based on an internal calendar, and to output a power control signal that starts up or shuts down power of an external device based at least on the determined current day, wherein
the power supply control signal output unit includes a hysteresis comparator circuit which is configured to detect the change in the lighting intensity based on a comparison between the output voltage of the photoelectric conversion unit and two sequentially input reference voltages, and to output the power control signal in accordance with said comparison.

2. The power supply control device according to claim 1, wherein the power supply control signal output unit includes a determination unit to determine a feasibility of outputting the power control signal based on a status of a signal input from the external device.

3. The power supply control device according to claim 2, wherein the signal input from the external device is the signal that indicates a status of power of the external device.

4. The power supply control device according to claim 1, wherein the power supply control signal output unit outputs a predetermined notification signal together with the power control signal when the power control signal is output.

5. The power supply control device according to claim 1, wherein the photoelectric conversion unit is a solar cell.

6. An image forming apparatus, comprising:
a power supply control device including:
a photoelectric conversion unit configured to convert light energy to electricity and output an output voltage corresponding to an intensity of the light energy;
a power supply control signal output unit driven by power converted by the photoelectric conversion unit, the power supply control signal output unit being configured to detect a change in a lighting intensity at an installation environment of the power supply control device based on the output voltage of the photoelectric conversion unit, to determine whether a current day is a weekday based on the detected change in the lighting intensity and based on an internal calendar, and to output a power control signal that starts up or shuts down power of an external device based at least on the determined current day; and
a power up and shut down unit to start up and shut down power of the image forming apparatus based on the power control signal input from the power supply control device, wherein
a starting up of the power of the image forming apparatus by the power up and shut down unit enables the image forming apparatus to perform image formation, and
the power supply control signal output unit includes a hysteresis comparator circuit which is configured to detect the change in the lighting intensity based on a comparison between the output voltage of the photoelectric conversion unit and two sequentially input reference voltages, and to output the power control signal in accordance with said comparison.

* * * * *